United States Patent
Holliday, III et al.

(10) Patent No.: US 10,855,079 B1
(45) Date of Patent: Dec. 1, 2020

(54) SYSTEM AND METHOD FOR REDUCING OSCILLATIONS IN A RENEWABLE ENERGY POWER SYSTEM

(71) Applicant: General Electric Company, Schenectady, NY (US)

(72) Inventors: Cornelius Edward Holliday, III, Forest, VA (US); Fernando Arturo Ramirez Sanchez, Salem, VA (US); Igor Berroteran, Salem, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/516,360

(22) Filed: Jul. 19, 2019

(51) Int. Cl.
- *H02J 3/24* (2006.01)
- *H02J 3/38* (2006.01)
- *H02J 3/44* (2006.01)
- *H02J 3/16* (2006.01)

(52) U.S. Cl.
CPC ........ *H02J 3/24* (2013.01); *H02J 3/16* (2013.01); *H02J 3/386* (2013.01); *H02J 3/44* (2013.01)

(58) Field of Classification Search
CPC ...... H02J 3/24; H02J 3/16; H02J 3/386; H02J 3/44
See application file for complete search history.

(56) References Cited

U.S. PATENT DOCUMENTS

| | | |
|---|---|---|
| 6,525,518 B1 | 2/2003 | Garnaes |
| 2018/0138708 A1 | 5/2018 | De Rijcke et al. |

FOREIGN PATENT DOCUMENTS

| | | |
|---|---|---|
| WO | WO2010/054657 A1 | 5/2010 |
| WO | WO2017/174085 A1 | 10/2017 |

*Primary Examiner* — Robert L Deberadinis
(74) *Attorney, Agent, or Firm* — Dority & Manning, P.A.

(57) ABSTRACT

A method for operating a renewable energy power system connected to a power grid includes operating the renewable energy power system at one or more first operational settings. The method also includes monitoring the renewable energy power system for electrical oscillations caused by a grid or system disturbance. In response to detecting the electrical oscillations being above a predetermined threshold indicative of the one or more first operational settings no longer being suitable for grid conditions, the method includes changing the one or more first operational settings to one or more different, second operational settings so as to reduce the electrical oscillations in the renewable energy power system.

20 Claims, 4 Drawing Sheets

FIG. 1

SYSTEM AND METHOD FOR REDUCING OSCILLATIONS IN A RENEWABLE ENERGY POWER SYSTEM

FIELD

The present disclosure relates generally to renewable energy power systems, such as a wind turbine, and more particular to a system and method for reducing oscillations in a renewable energy power system in response to a grid disturbance.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to a power grid via a grid breaker. Thus, the turbine transformer steps up the voltage amplitude of the electrical power such that the transformed electrical power may be further transmitted to the power grid.

In many wind turbines, the generator rotor may be electrically coupled to a bi-directional power converter that includes a rotor side converter joined to a line side converter via a regulated DC link. More specifically, some wind turbines, such as wind-driven doubly-fed induction generator (DFIG) systems or full power conversion systems, may include a power converter with an AC-DC-AC topology. In such system, the generator stator is separately connected to the power grid via a main transformer.

Wind turbines (and other renewable systems with grid interfacing power converters) have configurations that account for grid strength. Due to events on the grid, however, grids can change strength and impedance. This includes but is not limited to loss of a feeder, switched shunt capacitance, switched series compensation capacitance in the connected line or in a nearby connection. When the grid impedance changes and there is a grid or system disturbance, the system can oscillate due to having inappropriate settings (including gains) for the conditions currently on the grid. Such oscillations can be in current, voltage, torque, active power, reactive power, DC link voltage, etc.

Thus, the present disclosure is directed to systems and methods for reducing oscillations in a renewable energy power system in response to a grid disturbance.

BRIEF DESCRIPTION

Aspects and advantages of the invention will be set forth in part in the following description, or may be obvious from the description, or may be learned through practice of the invention.

In one aspect, the present disclosure is directed to a method for operating a renewable energy power system connected to a power grid. The method includes operating the renewable energy power system at one or more first operational settings. The method also includes monitoring the renewable energy power system for electrical oscillations caused by a grid or system disturbance. In response to detecting the electrical oscillations being above a predetermined threshold indicative of the one or more first operational settings no longer being suitable for grid conditions, the method includes changing the one or more first operational settings to one or more different, second operational settings so as to reduce the electrical oscillations in the renewable energy power system.

In an embodiment, the electrical oscillations in the renewable energy power system may be in current, voltage, torque, active power, or reactive power.

In another embodiment, the method may include determining at least one of a frequency, an amplitude, or a period of the electrical oscillations and comparing the frequency, the amplitude, or the period of the electrical oscillations to the predetermined threshold.

In further embodiments, changing the first operational setting(s) to the different, second operational setting(s) may include applying one or more oscillation correction signals to feedback signals, modulator output signals, or control loop signals of the renewable energy power system. In additional embodiments, the different, second operational setting(s) may be configured to increase a control margin of the renewable energy power system.

In several embodiments, the first operational setting(s) may correspond to one or more original operational settings of the renewable energy power system. Thus, in certain embodiments, the method may include reverting back to the one or more original operational settings on a periodic basis.

In an embodiment, if the grid or system disturbance is still present after reverting back to the one or more original operational settings, the method further comprises switching to one or more additional operational settings so as to reduce the electrical oscillations in the renewable energy power system.

In another embodiment, the first and second operational settings may include at least one of one or more grid strength settings, one or more generator-related gain settings, one or more volt-VAR regulator control settings, one or more current regulator loop settings, one or more photovoltaic settings, one or more reactive power spill settings, or one or more reactive power command settings.

In particular embodiments, the renewable energy power system may include at least one of a wind turbine power system, a solar power system, an energy storage power system, or combinations thereof.

In another aspect, the present disclosure is directed to a renewable energy power system connected to a power grid. The renewable energy power system may include a generator having a rotor and a stator and a power converter operably coupled to the generator. The renewable energy power system may also include a controller for controlling the renewable energy power system. As such, the controller is configured to perform a plurality of operations, including but not limited to operating the renewable energy power system at one or more first operational setting, monitoring the renewable energy power system for electrical oscillations, and in response to detecting the electrical oscillations being above a predetermined threshold indicative of the one or more first operational settings no longer being suitable for grid conditions, changing the first operational setting(s) to one or more different, second operational settings so as to reduce the electrical oscillations in the renewable energy power system, the electrical oscillations being caused by a grid or system disturbance.

It should also be understood that the renewable energy power system may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
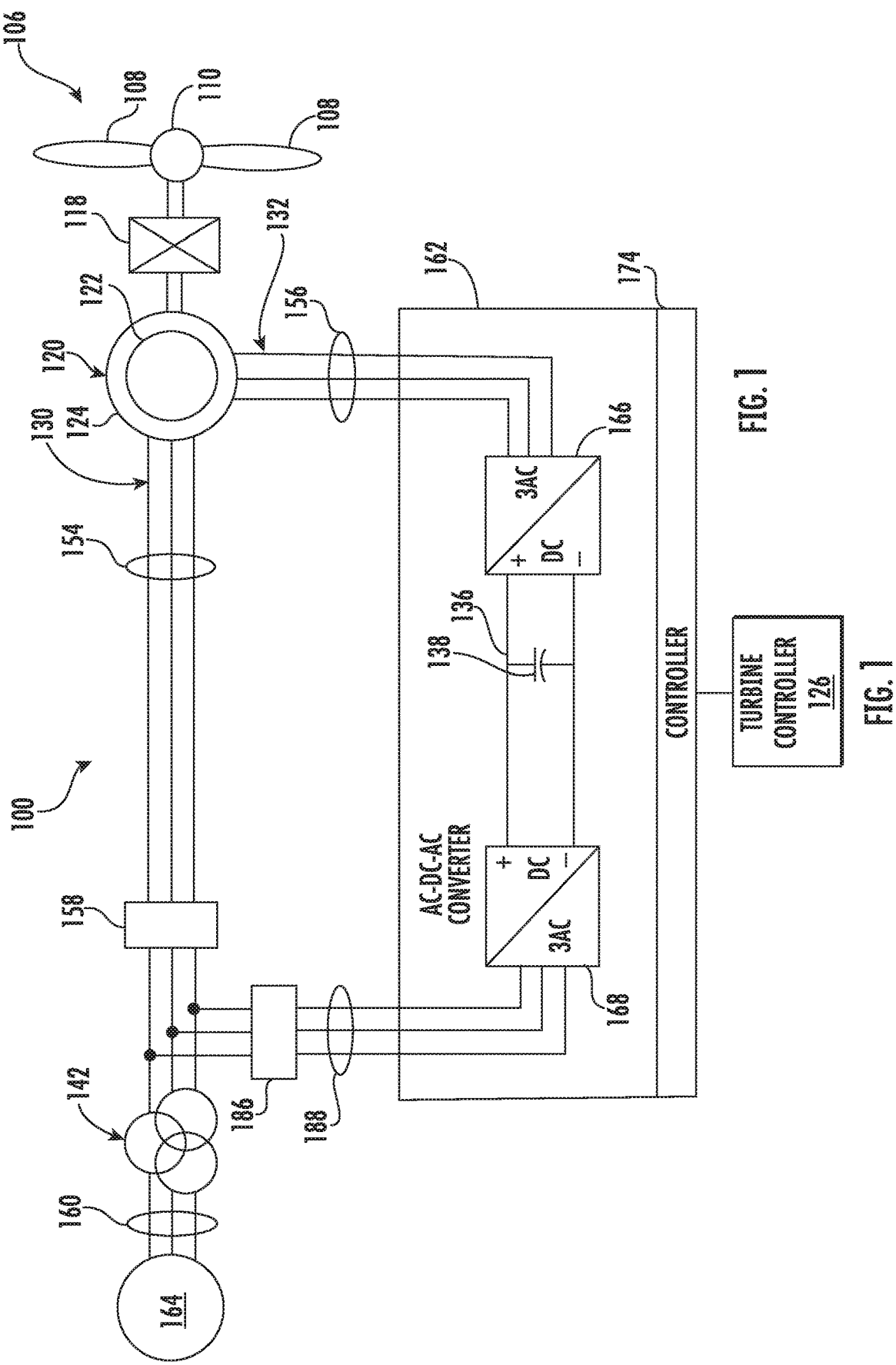
FIG. 1 illustrates one embodiment of an example renewable energy power system according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Grid authorities require compliance to power and VAR support and recovery requirements, while customers need systems that can operate in increasingly challenging grid connection conditions. This can be a long transmission line connection to the grid with or without series compensation, low SCR connections, intermittently low SCR connections, etc. The customers also need systems that stay connected while being subjected to grid fault conditions (ZVRT, LVRT, HVRT, multiple random series of faults). Customers also need systems that can survive harsh grid conditions, such as islanding.

Thus, renewable energy power systems, such as wind turbines, solar converters, battery storage systems, or hybrid applications, have configurations that account for grid strength. Due to events on the grid, grids can change strength and impedance. This includes but is not limited to loss of a feeder, switched shunt capacitance, switched series compensation capacitance in the connected line or in a nearby connection. When the grid impedance changes and there is a grid or system disturbance, the system can oscillate due to having inappropriate settings (including gains) for the conditions currently on the grid. The oscillations can be in current, voltage, torque, active power, reactive power, DC link voltage, etc. Thus, the present disclosure is directed to oscillation detection algorithms in the controller that can be used to detect underdamped or undamped oscillations in the power system. Each signal/control loop with oscillation detection is connected to logic such that when oscillation frequency and amplitude conditions are met, the configuration will switch to settings most likely to cause the oscillations to be damped. This includes but is not limited to grid strength settings, generator related gain settings, one or more volt-VAR regulator control settings, one or more current regulator loop settings, one or more photovoltaic settings, one or more reactive power spill settings, or one or more reactive power command settings The ability to change configuration settings when oscillations are detected allows the control to have better response while being able to trade response for stability when conditions require. The alternate is to tune and validate one set of settings that meets all conflicting requirements.

Referring now to the drawings, FIG. 1 illustrates an example wind driven doubly-fed induction generator (DFIG) system 100 according to one embodiment of the present disclosure. Example aspects of the present disclosure are discussed with reference to the DFIG wind turbine 10 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the example system 100, a rotor 106 includes a plurality of rotor blades 108 coupled to a rotatable hub 110, and together define a propeller. The propeller is coupled to an optional gearbox 118, which is, in turn, coupled to a generator 120 having a rotor 122 and a stator 124. In accordance with aspects of the present disclosure, the generator 120 may be any suitable generator, including for example, a doubly fed induction generator (DFIG). The generator 120 is typically coupled to a stator bus 154 and a power converter 162 via a rotor bus 156. The stator bus 154 provides an output multiphase power (e.g. three-phase power) from a stator of the generator 120 and the rotor bus 156 provides an output multiphase power (e.g. three-phase power) of a rotor of the generator 120.

The power converter 162 includes a rotor-side converter 166 coupled to a line-side converter 168. The DFIG 120 is coupled to the rotor-side converter 166 via the rotor bus 156. The line-side converter 168 is coupled to a line-side bus 188. Further, as shown, the stator bus 154 may be directly connected to the line-side bus 188. In example configurations, the rotor-side converter 166 and the line-side converter 168 are configured for normal operating mode in a three-phase, PWM arrangement using insulated gate bipolar transistor (IGBT) switching elements, which are discussed in more detail herein. The rotor-side converter 166 and the line-side converter 168 can be coupled via a DC link 136 across which is the DC link capacitor 138. In alternative embodiments, the stator bus 154 and the power converter 162 may be connected to separate isolated windings of a transformer (not shown), i.e. at the junction of the generator breaker 158 and the converter breaker 186.

The power converter 162 can be coupled to a controller 174 to control the operation of the rotor-side converter 166 and the line-side converter 168 and other aspects of the power system 100. The converter controller 174 may be further coupled with a turbine controller 126. For example, as shown particularly in FIG. 2, the controllers 126, 174 can include any number of control devices. In one implementation, for example, the controllers 126, 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands (e.g. pulse width modulation commands) to the switching elements of the power converter 162 and other aspects of the power system 100.

Figure 2:
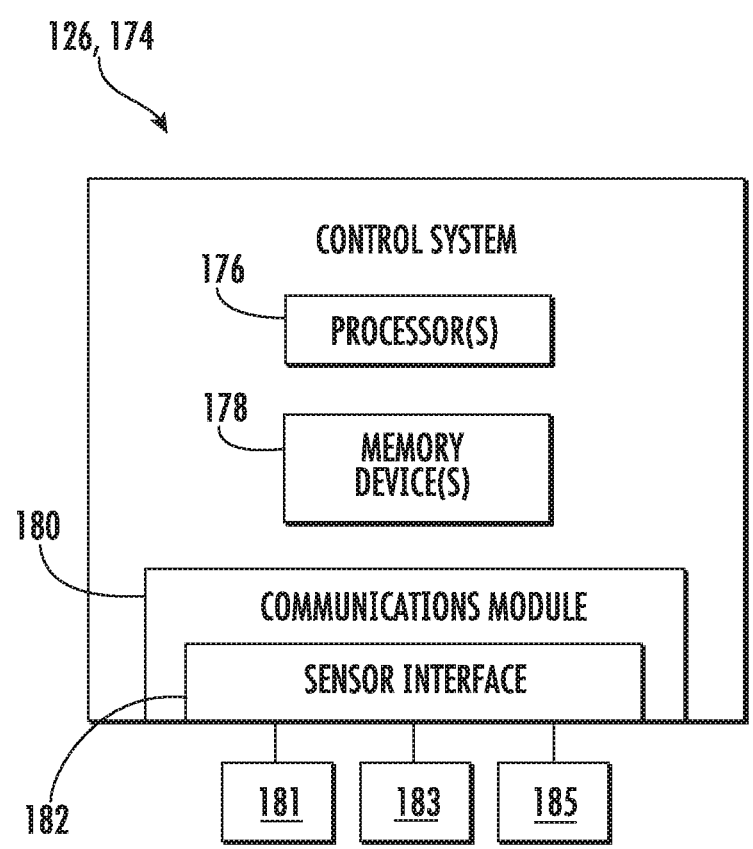
FIG. 2 illustrates a block diagram of one embodiment of a controller suitable for use with the renewable energy power system shown in FIG. 1.

Additionally, the controllers 126, 174 may also include a communications module 180 to facilitate communications between the controllers 126, 174 and the various components of the power system 100, e.g. any of the components of FIG. 1. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors (e.g. sensors 181, 183, 185) may be communicatively coupled to the communications module 180 using any suitable means. For example, as shown in FIG. 2, the sensors 181, 183, 185 are coupled to the sensor interface 182 via a wired connection. However, in other embodiments, the sensors 181, 183, 185 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the controllers 126, 174 to perform the various functions as described herein.

In operation, alternating current power generated at the DFIG 120 by rotation of the rotor 106 is provided via a dual path to a grid bus 160 and ultimately to an electrical grid 164. The dual paths are defined by a generator power path 130 and a converter power path 132. On the converter power path 132, sinusoidal multi-phase (e.g. three-phase) alternating current (AC) power is provided to the power converter 162 via the rotor bus 156.

The rotor-side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power suitable for the electrical grid 160. In particular, switching elements (e.g. IGBTs) used in bridge circuits of the line-side power converter 168 can be modulated to convert the DC power on the DC link 136 into AC power on the line-side bus 188. The AC power from the power converter 162 can be combined with the power from the stator of the DFIG 120 to provide multi-phase power (e.g. three-phase power) having a frequency maintained substantially at the frequency of the electrical grid 160 (e.g. 50 Hz/60 Hz). Further, as shown, the associated electrical power can be transmitted to a main transformer 142 that is typically connected to the electrical grid 160. Thus, the main transformer 142 steps up the voltage amplitude of the electrical power such that the transformed electrical power may be further transmitted to the power grid 160.

Various circuit breakers and switches, such as a generator breaker 158 and converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the controller 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Figure 3:
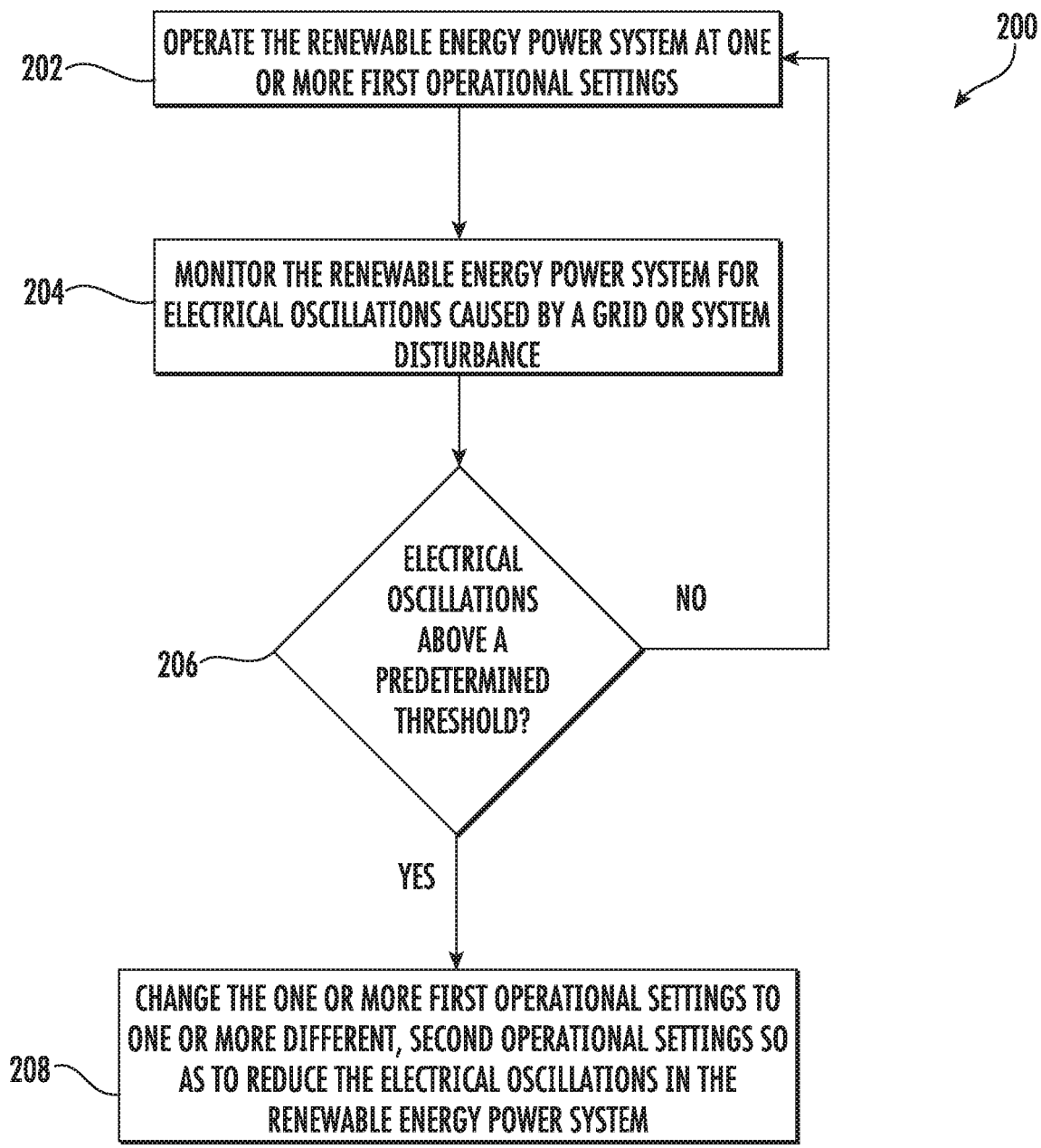
FIG. 3 illustrates a flow diagram of one embodiment of a method for operating a renewable energy power system connected to a power grid according to the present disclosure.
Figure 4:
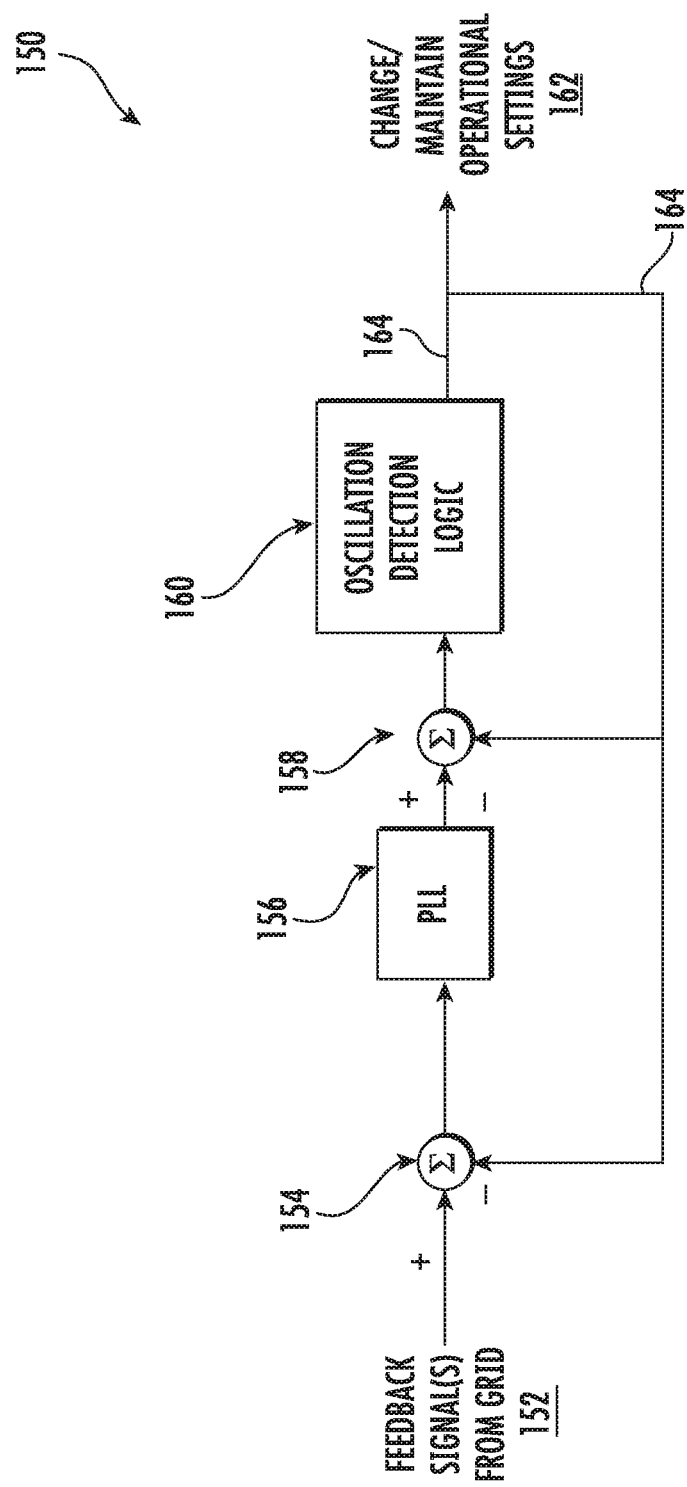
FIG. 4 illustrates a schematic diagram of one embodiment of a system for operating the wind turbine power system according to the present disclosure.

Referring now to FIGS. 3 and 4, systems and methods for operating a renewable energy power system, such as the wind turbine power system 100 described herein, connected to a power grid according to the present disclosure are illustrated. More specifically, FIG. 3 illustrates a flow diagram of one embodiment of a method 200 for operating the wind turbine power system 100 according to the present disclosure. FIG. 4 illustrates a schematic diagram of one embodiment of a system 150 for operating the wind turbine power system 100 according to the present disclosure.

In general, the method 200 and system 150 described herein generally applies to operating the wind turbine power system 100 described above. However, it should be appreciated that the disclosed method 200 and system 150 may be implemented using any other suitable power system that is configured to supply power, including reactive power, for application to a load, such as a power grid. Further, FIG. 3 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

Referring particularly to FIG. 3, as shown at (202), the method 200 may include operating the wind turbine power system 100 at one or more first operational settings. As shown at (204), the method 200 may include monitoring the wind turbine power system 100 for electrical oscillations caused by a grid or system disturbance. In an embodiment, the electrical oscillations in the wind turbine power system 100 may be in current, voltage, torque, active power, or reactive power. For example, as shown in FIG. 4, the controller 126, 174 may monitor the current, voltage, torque, active power, and/or reactive power of the grid and receive one or more feedback signals 152 representative thereof.

In another embodiment, the method 200 may include determining a frequency, an amplitude, or a period of the electrical oscillations. For example, as shown in FIG. 4, the controller 126, 174 may determine the frequency, amplitude, or period of the electrical oscillations using a phase-locked loop (PLL) 154.

Referring back to FIG. 3, as shown at (206), the method 200 may further include determining whether the electrical oscillations are above a predetermined threshold. For example, in one embodiment, as shown in FIG. 4, the method 200 may include comparing the frequency, the amplitude, and/or the period of the electrical oscillations to the predetermined threshold via an oscillation detection logic module 160.

If the electrical oscillations are above the predetermined threshold, as shown at (208) of FIG. 3, the method 200 includes changing the first operational setting(s) to one or more different, second operational settings so as to reduce the electrical oscillations in the wind turbine power system 100. For example, in particular embodiments, the first and second operational settings described herein may include at least one of one or more grid strength settings, one or more generator-related gain settings, one or more one or more volt-VAR regulator control settings, one or more current regulator loop settings, one or more photovoltaic settings, one or more reactive power spill settings, or one or more reactive power command settings More specifically, as shown in FIG. 4, one of the controllers 126, 174 may be configured to change the first operational setting(s) to the different, second operational setting(s) by applying one or more oscillation correction signals 164 to the feedback signals 152 (as shown at (154)), modulator output signals 156 (as shown at (158)), or control loop signals of the wind turbine power system 100. In additional embodiments, the different, second operational setting(s) may be configured to increase a control margin of the renewable energy power system 100. The ability to change settings when specific oscillations are detected allows the use of control settings that are optimized for typical conditions without having to tune the control to unconditionally stable in an increasing number of abnormal grid conditions and fault conditions.

In several embodiments, the first operational setting(s) may correspond to one or more original operational settings of the renewable energy power system 100. Thus, in certain embodiments, the method 200 may include reverting back to or resetting the original operational setting(s) on a periodic basis. In further embodiments, conditions can be set to lock out the reset to the original settings until the lock out is manually reset or reset by external input from turbine control or farm control. In an embodiment, if the grid or system disturbance is still present after reverting back to the original operational setting(s), the method 200 may include switching to one or more additional operational settings so as to reduce the electrical oscillations in the wind turbine power system 100.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a renewable energy power system connected to a power grid, the method comprising:
    operating the renewable energy power system at one or more first operational settings;
    monitoring the renewable energy power system for electrical oscillations caused by a grid or system disturbance; and,
    in response to detecting the electrical oscillations being above a predetermined threshold indicative of the one or more first operational settings no longer being suitable for grid conditions, changing the one or more first operational settings to one or more different, second operational settings so as to reduce the electrical oscillations in the renewable energy power system.

2. The method of claim 1, wherein the electrical oscillations in the renewable energy power system are in at least one of current, voltage, torque, active power, or reactive power.

3. The method of claim 1, further comprising:
    determining at least one of a frequency, an amplitude, or a period of the electrical oscillations; and, comparing the frequency, the amplitude, or the period of the electrical oscillations to the predetermined threshold.

4. The method of claim 3, wherein changing the one or more first operational settings to one or more different, second operational settings further comprising applying one or more oscillation correction signals to feedback signals, modulator output signals, or control loop signals of the renewable energy power system.

5. The method of claim 1, wherein the one or more different, second operational settings are configured to increase a control margin of the renewable energy power system.

6. The method of claim 1, wherein the one or more first operational settings correspond to one or more original operational settings of the renewable energy power system.

7. The method of claim 6, further comprising reverting back to the one or more original operational settings on a periodic basis.

8. The method of claim 7, wherein, if the grid or system disturbance is still present after reverting back to the one or more original operational settings, the method further comprises switching to one or more additional operational settings so as to reduce the electrical oscillations in the renewable energy power system.

9. The method of claim 1, wherein the one or more first and second operational settings comprise at least one of one or more grid strength settings, one or more generator-related gain settings, one or more volt-VAR regulator control settings, one or more current regulator loop settings, one or more photovoltaic settings, one or more reactive power spill settings, or one or more reactive power command settings.

10. The method of claim 1, wherein the renewable energy power system comprises at least one of a wind turbine power system, a solar power system, an energy storage power system, or combinations thereof.

11. A renewable energy power system connected to a power grid, the renewable energy power system comprising:
a generator comprising a rotor and a stator;
a power converter operably coupled to the generator; and
a controller for controlling the renewable energy power system, the controller configured to perform a plurality of operations, the plurality of operations comprising:
operating the renewable energy power system at one or more first operational settings;
monitoring the renewable energy power system for electrical oscillations; and,
in response to detecting the electrical oscillations being above a predetermined threshold indicative of the one or more first operational settings no longer being suitable for grid conditions, changing the one or more first operational settings to one or more different, second operational settings so as to reduce the electrical oscillations in the renewable energy power system, the electrical oscillations being caused by a grid or system disturbance.

12. The renewable energy power system of claim 11, wherein the electrical oscillations are in at least one of current, voltage, torque, active power, or reactive power.

13. The renewable energy power system of claim 11, wherein the plurality of operations further comprise:
determining at least one of a frequency, an amplitude, or a period of the electrical oscillations; and,
comparing the frequency, the amplitude, or the period of the electrical oscillations to the predetermined threshold.

14. The renewable energy power system of claim 13, wherein changing the one or more first operational settings to the one or more different, second operational settings further comprising applying one or more oscillation correction signals to feedback signals, modulator output signals, or control loop signals of the renewable energy power system.

15. The renewable energy power system of claim 1, wherein the one or more different, second operational settings are configured to increase a control margin of the renewable energy power system.

16. The renewable energy power system of claim 11, wherein the one or more first operational settings correspond to one or more original operational settings of the renewable energy power system.

17. The renewable energy power system of claim 16, further comprising reverting back to the one or more original operational settings on a periodic basis.

18. The renewable energy power system of claim 17, wherein, if the grid or system disturbance is still present after reverting back to the one or more original operational settings, the plurality of operations further comprise switching to one or more additional operational settings so as to reduce the electrical oscillations in the renewable energy power system.

19. The renewable energy power system of claim 11, wherein the one or more first and second operational settings comprise at least one of one or more grid strength settings, one or more generator-related gain settings, one or more volt-VAR regulator control settings, one or more current regulator loop settings, one or more photovoltaic settings, one or more reactive power spill settings, or one or more reactive power command settings.

20. The renewable energy power system of claim 11, wherein the renewable energy power system comprises at least one of a wind turbine power system, a solar power system, an energy storage power system, or combinations thereof.

* * * * *